3,330,879
ALKYLATION OF AROMATIC HYDROCARBONS
Anthony George Goble, Skewen, Neath, Glamorgan, and
Paul Anthony Lawrence, Stanwell, England, assignors
to The British Petroleum Company Limited of Britannic House, London, England, a corporation of England
No Drawing. Filed Feb. 25, 1965, Ser. No. 435,343
9 Claims. (Cl. 260—671)

This invention relates to the alkylation of aromatic hydrocarbons with olefins or olefin-acting compounds.

The complete specification of U.K. patent application No. 32,502/61 and U.S. Patent 3,248,442 disclose a process for the alkylation of aromatic hydrocarbons which comprises reacting an aromatic hydrocarbon with an olefin or olefin-acting compound under alkylating conditions with a catalyst prepared by contacting alumina with a compound of general formula

(where X and Y may be the same or different and selected from H, Cl, Br, F or SCl, or where X and Y together may be O or S) under non-reducing conditions and at a temperature such that chlorine is taken up by the alumina without the production of free aluminium chloride.

It has now been found that there are benefits in operating such a process in the presence of hydrogen, particularly when the alkylating compounds are olefin-acting compounds.

According to the present invention, therefore, a process for the alkylation of aromatic hydrocarbons comprises reacting an aromatic hydrocarbon with an olefin or olefin-acting compound under alkylating conditions in the presence of hydrogen and a catalyst prepared by contacting alumina with a compound of general formula

(where X and Y may be the same or different and selected from H, Cl, Br, F or SCl, or where X and Y together may be O or S) under non-reducing conditions and at a temperature such that chlorine is taken up by the alumina without the production of free aluminium chloride, the said catalyst being free from a hydrogenating metal component.

The mole ratio of hydrogen to feedstock (olefin or olefin-acting compound and aromatic hydrocarbon) may be in the range 0.2 to 20:1.

Other features of the process may be similar to those disclosed in the above mentioned complete specification. Thus the preferred aromatic hydrocarbons are monocyclic aromatics, for example benzene or alkyl benzenes, but the process may also be applied to polynuclear aromatics, for example naphthalene and alkyl naphthalenes, and also to compounds having two or more aryl groups, for example diphenyl.

The preferred alkylating compounds are olefin-acting compounds, particularly alkyl halides having more than two carbon atoms per molecule. The halides are preferably mono-halides, and suitable halides are chlorides and bromides, particularly the former. The alkylation of aromatics finds particular use in the preparation of detergent alkylate, and with the current phasis on the preparation of biologically soft detergents, there is a tendency towards the use of straight-chain alkyl chlorides having from 9 to 16 carbon atoms per molecule, more particularly 10 to 13 carbon atoms per molecule and one chlorine atom per molecule. Such alkyl chlorides can be prepared, for example, by chlorination of $C_{10}$ and $C_{13}$ normal paraffins extracted from kerosene by means of a 5° A. molecular sieve and are preferred feed-stocks for use in the present invention.

When olefins are used as alkylating compounds the olefins may contain one or more double bonds and may be acylic or cyclic olefins. Preferably they have only one double bond. Preferably they are acyclic olefins having from 2 to 18 carbon atoms, for example ethylene, propylene, butenes, isobutylene, pentenes or propylene tetramer. Mixtures of olefins may also be used, and the olefins may also be admixed with other inert materials for example nitrogen or saturated hydrocarbons.

The alkylation conditions employed will depend on the reactants used but the temperature will normally be within the range 0 to 300° C., preferably 15–200° C. and the pressure from atmospheric to 1000 p.s.i.g.

When alkylating benzene with chlorinated $C_{10}$ to $C_{13}$ normal paraffins, temperatures of from 15 to 90° C. have been found to be suitable. Preferably the aromatic hydrocarbon is in excess of the olefin or olefin-acting compound, suitable ratios of aromatic hydrocarbon to olefin or olefin-acting compound being from 1.5 to 1 to 10–1. Higher ratios tend to reduce the formation of polyalkylated products and are thus particularly desirable when it is desired to produce predominantly monoalkylated products. The liquid space velocity of the aromatic hydrocarbon may be in the range of 0.1 to 20 v./v./hr., preferably 0.25 to 2.5 v./v./hr.

The process is desirably carried out under anhydrous conditions and with water-free reactants to minimise loss of halogen from the catalyst.

The catalyst used and its method of preparation is described in the complete specification of U.K. patent application No. 32,502/61 referred to above.

The invention is illustrated by the following comparative example.

EXAMPLE

Detergent alkylate was prepared by alkylating benzene with partially chlorinated $C_{10}$–$C_{13}$ n-paraffins. The chlorine content of the n-paraffins was 4.3% wt., equivalent to 20% wt. of chlorinated paraffins assuming only mono-chlorination. A chromatographic analysis showed that most of the chlorine compounds were mono-chloro-compounds and that there was a random distribution of chlorine along the paraffin chains.

The catalyst used was prepared by treating a commercial alumina having a surface area of 450 m.²/g. with carbon tetrachloride as follows.

60 ml. (48 g.) of alumina in the form of 1/16 inch extrudates were charged to a glass reactor heated with electrical windings. A dry air flow of 45 l./hr. was established downflow through the catalyst bed, and the catalyst temperature raised to 550° F. in about 2 hours. The air flow was then diverted to pass through a dreschel bottle containing Analar carbon tetrachloride which was maintained at 0° C., before passing through the catalyst bed. Treatment with the air/carbon tetrachloride vapor stream was continued for 1 hour, after which the catalyst was purged with pure air, cooled under air flow, and discharged from the reactor to a dry airtight container where it was kept until required for use. The chlorine content of the catalyst was 12.4% wt.

A 30 ml. portion of the chlorinated-alumina catalyst prepared as described above was used to alkylate benzene with the partially chlorinated $C_{10}$–$C_{13}$ n-paraffins under the following conditions:

Pressure _____ 250 p.s.i.g.
Temperature _____ 150° F.
Space velocity _____ 0.5 v./v./hr.
Once-through gas _____ $H_2$ from 0–136, $N_2$ from 136–176 HOS.
Once-through gas rate ___ 2500 s.c.f./b.
Feedstock _____ Blend of chlorinated n-paraffins, n-paraffins and benzene in a 4:1 ratio by volume of (chlorinated n-paraffins+n-paraffins) to benzene, the (chlorinated n-paraffins+n-paraffins) fraction containing 20% of chlorinated n-paraffins, and the molar ratio of benzene to chlorinated n-paraffins being 2:1.

The conversion of chloroparaffins was determined by GLC measurements to determine the relative disappearance of the chloroparaffin peaks, and also by direct measurement of the chlorine content of the water washed products. Both methods gave the same answers.

In the following table results obtained during the run are given to illustrate the relative effects of nitrogen and hydrogen on catalyst activity:

| Once-through gas | $H_2$ | | | | $N_2$ | | | | |
|---|---|---|---|---|---|---|---|---|---|
| Hours on stream | 94 | 112 | 127 | 136 | 149 | 155 | 161 | 168 | 176 |
| Conversion of chloroparaffins, percent wt | 55 | 52 | 53 | 58 | 58 | 53 | 49 | 47 | 37 |

With hydrogen a steady conversion of about 55 percent weight was obtained, but when nitrogen was used a gradual decline in conversion was observed.

We claim:
1. A process for the alkylation of aromatic hydrocarbons which comprises reacting an aromatic hydrocarbon with at least one member of the group consisting of olefins and olefin-acting compounds at a temperature of from 0 to 300° C. and a pressure of from atmospheric to 1000 p.s.i.g., in the presence of hydrogen and of a catalyst prepared by contacting alumina with a compound of general formula:

where X and Y are each selected from the group consisting of H, Cl, Br, F and SCl, in the absence of free hydrogen and at a temperature in the range of 149–593° C. such that chlorine is taken up by the alumina without the production of free aluminium chloride, the said catalyst being free from a hydrogenating metal component.

2. A process as claimed in claim 1, wherein the said alumina is admixed with at least one other refractory oxide selected from the oxides of elements of Groups II to V of the Periodic Table before treatment with the said compound.

3. A process as claimed in claim 1 wherein the aromatic hydrocarbon is a mono-cyclic aromatic hydrocarbon.

4. A process as claimed in claim 1 wherein at least one acyclic olefin having from 2 to 18 carbon atoms is reacted with the said aromatic hydrocarbon.

5. A process as claimed in claim 1 wherein at least one olefin-acting compound containing more than 2 carbon atoms per molecule is reacted with the said aromatic hydrocarbon.

6. A process as claimed in claim 1 wherein the mole-ratio of hydrogen to feedstock is from 2:1 to 20:1.

7. A process as claimed in claim 1 wherein the aromatic hydrocarbon is in excess of the olefinic constituent of the feedstock, the mole-ratio of aromatic hydrocarbon to the said constituent being from 1.5:1 to 10:1.

8. A process for the alkylation of aromatic hydrocarbons which comprises reacting an aromatic hydrocarbon with at least one member of the group consisting of straight-chain alkyl mono-chlorides having from 9–16 carbon atoms at a temperature of from 0 to 300° C., a pressure of from atmospheric to 1000 p.s.i.g., and an aromatic hydrocarbon liquid space velocity of from 0.1–20 v./v./hr., in the presence of hydrogen and of a catalyst prepared by contacting alumina with a compound of general formula:

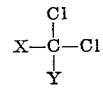

where X and Y are each selected from the group consisting of H, Cl, Br, F and SCl, in the absence of free hydrogen and at a temperature in the range of 149–593° C. such that chlorine is taken up by the alumina without the production of free aluminium chloride, the said catalyst being free from a hydrogenating metal component and having a chlorine content of from $2.0 \times 10^{-4}$ to $3.5 \times 10^{-4}$ g./sq. metre of the original surface area.

9. A process for the alkylation of aromatic hydrocarbons which comprises reacting an aromatic hydrocarbon with at least one member of the group consisting of olefins and olefin-acting compounds at a temperature of from 0 to 300° C. and a pressure of from atmospheric to 1000 p.s.i.g., in the presence of hydrogen and of a catalyst prepared by contacting alumina with a compound of general formula:

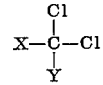

where X and Y together form a divalent radical selected from the group consisting of O and S, in the absence of free hydrogen and at a temperature in the range of 149–593° C. such that chlorine is taken up by the alumina without the production of free aluminium chloride, the said catalyst being free from a hydrogenating metal component.

References Cited
UNITED STATES PATENTS
3,248,442   4/1966   Goble et al. _____ 260—671

OTHER REFERENCES
McAllister, "Chemistry of Petroleum Hydrocarbons," vol. III, Reinhold Publishing Corp. (1955), pages 579–602.

"Petroleum Refiner Petrochemical Handbook," November 1953, page 211.

DELBERT E. GANTZ, *Primary Examiner.*

C. R. DAVIS, *Assistant Examiner.*